US011920382B2

(12) United States Patent
Scalf et al.

(10) Patent No.: US 11,920,382 B2
(45) Date of Patent: Mar. 5, 2024

(54) ROTATING SUPPORT HANDLE ASSEMBLY FOR BOTTOM-HINGED DOOR

(71) Applicant: Midea Group Co., Ltd., Foshan (CN)

(72) Inventors: Eric Scalf, Louisville, KY (US); Vinayak Naik, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 719 days.

(21) Appl. No.: 17/021,165

(22) Filed: Sep. 15, 2020

(65) Prior Publication Data

US 2022/0081949 A1 Mar. 17, 2022

(51) Int. Cl.

| | |
|---|---|
| ***E05B 1/00*** | (2006.01) |
| ***E05B 7/00*** | (2006.01) |
| *F24C 15/02* | (2006.01) |
| *F25D 23/02* | (2006.01) |

(52) U.S. Cl.

CPC .............. *E05B 7/00* (2013.01); *F24C 15/024* (2013.01); *F25D 23/028* (2013.01)

(58) Field of Classification Search

CPC ... E05B 7/00; E05B 5/00; E05B 5/003; E05B 5/006; E05B 1/00; E05B 1/0015; E05B 1/0053; E05B 1/028; E05B 85/10; E05B 79/06; Y10T 292/57; A47B 95/02; A47B 2095/023; F25D 23/02; F25D 23/028; F25D 2400/06; F24C 15/024; E05Y 2600/46; E05Y 2900/31

See application file for complete search history.

(56) References Cited

U.S. PATENT DOCUMENTS

| | | | | |
|---|---|---|---|---|
| 344,521 | A | 6/1886 | Culver | |
| 1,091,393 | A | 3/1914 | Schulde | |
| 1,533,831 | A * | 4/1925 | Colchin | E05C 17/443 292/DIG. 15 |
| 1,782,523 | A | 11/1930 | Warren | |
| 2,015,775 | A | 10/1935 | Abraham | |
| 2,460,681 | A | 2/1949 | Davis | |
| 3,322,480 | A | 5/1967 | Barnstead | |
| 3,354,878 | A | 11/1967 | Balls | |
| 3,393,950 | A | 7/1968 | Dutcher et al. | |
| 3,529,881 | A | 9/1970 | Kaldenberg | |
| 3,738,727 | A | 6/1973 | Race | |
| 3,912,350 | A | 10/1975 | Gurubatham | |

(Continued)

FOREIGN PATENT DOCUMENTS

| | | |
|---|---|---|
| CN | 102661082 A | 9/2012 |
| CN | 102269508 B | 5/2013 |

(Continued)

OTHER PUBLICATIONS

Related Applications Transmittal dated Jan. 3, 2023.

(Continued)

*Primary Examiner* — Chuck Y Mah
(74) *Attorney, Agent, or Firm* — Gray Ice Higdon

(57) ABSTRACT

A rotating support handle assembly for supporting a bottom-hinged door is disclosed. The rotating support handle assembly may comprise a handle member and a support member. The handle member may rotate from a first position to a second position, and the support member may be configured to contact a floor to provide support to the bottom-hinged door in the second position.

17 Claims, 4 Drawing Sheets

(56) References Cited

U.S. PATENT DOCUMENTS

| | | | | | |
|---|---|---|---|---|---|
| 4,092,973 | A | | 6/1978 | Bernazzani | |
| 4,494,784 | A | * | 1/1985 | Haynes | E05C 17/443 292/338 |
| 4,624,511 | A | | 11/1986 | Oehme | |
| 4,687,262 | A | | 8/1987 | St Louis | |
| 4,779,941 | A | | 10/1988 | Jessop | |
| 4,836,624 | A | | 6/1989 | Schwickrath | |
| 4,848,312 | A | | 7/1989 | Roy | |
| 5,937,481 | A | | 8/1999 | Faringosi | |
| 6,263,867 | B1 | | 7/2001 | Skelton | |
| 7,628,461 | B2 | | 12/2009 | Carden et al. | |
| 8,025,349 | B2 | | 9/2011 | Lim et al. | |
| 8,231,190 | B2 | | 7/2012 | Ertz | |
| 8,506,028 | B2 | | 8/2013 | Lim | |
| 9,157,641 | B1 | | 10/2015 | Draper | |
| 9,297,572 | B2 | | 3/2016 | Bischoff | |
| 10,443,286 | B1 | | 10/2019 | Cocco | |
| 10,478,040 | B1 | | 11/2019 | Ford, Jr. | |
| 2008/0223356 | A1 | | 9/2008 | Shenouda | |
| 2009/0151608 | A1 | | 6/2009 | Aldred et al. | |
| 2010/0281911 | A1 | | 11/2010 | Ha | |
| 2011/0273070 | A1 | | 11/2011 | Shin | |
| 2012/0042670 | A1 | | 2/2012 | Lee | |
| 2012/0060544 | A1 | | 3/2012 | Lee | |
| 2012/0091874 | A1 | | 4/2012 | Lee | |
| 2013/0257238 | A1 | | 10/2013 | Herron | |
| 2016/0076289 | A1 | | 3/2016 | Choi | |
| 2017/0051542 | A1 | * | 2/2017 | Reske | E05B 63/244 |
| 2017/0350638 | A1 | | 12/2017 | Park | |
| 2018/0132695 | A1 | * | 5/2018 | Lagness | A47L 15/4257 |
| 2018/0163443 | A1 | | 6/2018 | Park | |
| 2018/0283698 | A1 | * | 10/2018 | Lee | F24C 15/024 |
| 2019/0024965 | A1 | | 1/2019 | Park | |
| 2020/0141627 | A1 | * | 5/2020 | Lambert | F25D 11/00 |
| 2020/0340732 | A1 | | 10/2020 | Querfurth | |
| 2023/0184483 | A1 | | 6/2023 | Jenkinson | |

FOREIGN PATENT DOCUMENTS

| | | | | | |
|---|---|---|---|---|---|
| CN | 102445045 | B | | 9/2013 | |
| CN | 102359308 | B | | 7/2016 | |
| CN | 107246184 | A | | 10/2017 | |
| CN | 108020010 | A | | 5/2018 | |
| CN | 109723279 | B | | 9/2021 | |
| CN | 215632336 | U | | 1/2022 | |
| CN | 216668084 | U | | 6/2022 | |
| DE | 8416860 | U1 | | 11/1984 | |
| DE | 10063353 | A1 | | 6/2002 | |
| DE | 102007041301 | A1 | | 3/2009 | |
| DE | 102015116016 | A1 | * | 3/2016 | A21B 3/02 |
| DE | 102014223383 | A1 | | 5/2016 | |
| DE | 102015104200 | A1 | | 9/2016 | |
| EP | 0632180 | B1 | | 9/1996 | |
| EP | 3021047 | A1 | | 5/2016 | |
| GB | 190016241 | A | * | 4/1901 | |
| WO | WO-2004049865 | A1 | * | 6/2004 | A47L 15/4257 |
| WO | WO2009027405 | A1 | | 3/2009 | |

OTHER PUBLICATIONS

Neff, N 70 Built-in Oven, Retrieved from: https://www.neff-home.com/uk/productlist/ovens-compact-ovens/ovens/single-ovens/B57CR22NOB#/Tabs=section-manuals/Togglebox=accessories/Togglebox=manuals/Togglebox=accessoriesOthers/, Retrieved on Jun. 2, 2022.

Draper, Richard James, Oven Door Support Legs, Retrieved from https://forsalebyinventor.com/products/portfolio-item/oven-door-support-legs/, 2014.

Tran, Hanh Van, United States Patent and Trademark Office, Office Action issued in U.S. Appl. No. 17/825,768, 84 pages, dated Apr. 17, 2023.

Tran, Hanh Van, United States Patent and Trademark Office, Non-Final Office Action issued in U.S. Appl. No. 17/825,768, 102 pages, dated Oct. 18, 2023.

* cited by examiner

ROTATING SUPPORT HANDLE ASSEMBLY FOR BOTTOM-HINGED DOOR

BACKGROUND

Bottom-hinged doors are common for some appliances nowadays. For example, some residential or commercial kitchen appliances, such as some type of ovens, dishwashers, and refrigerators have bottom-hinged doors that open by bringing the doors all the way down to a position parallel to, and several inches or feet above, the floor. While consumers appreciate the benefits brought by a bottom-hinged door, there are also drawbacks associated with such a design. Given that the bottom-hinged door often comes with a heavy weight due to its construction and material, the opened bottom-hinged door may become a tip hazard with a vertical load from the heavy weight of the bottom-hinged door. It could be dangerous as an unsupported bottom-hinged door may inadvertently upset the balance of an appliance, such as a refrigerator, to tip forward, causing serious injuries to consumers. Also, the connection part of the bottom-hinged door, such as the latch or hinge connection member between the bottom-hinged door and the main body of an appliance, may be damaged or bent by stretching the connection member beyond its intended use.

While there are some existing support devices for bottom-hinged doors, many such support devices do not provide simple deployment mechanisms, sufficient and simple adjustment features, and/or simple installations to existing doors. Also, many such support devices may damage the structure of existing doors, door handles, and/or floor surfaces during the installation and use. In addition, many such support devices are visibly unappealing and severely impact the aesthetic qualities of an appliance and even the room setting as a whole, as such support devices are seen and used by consumers every day.

Accordingly, there exists a need for a bottom-hinged door support device without the disadvantages as described above.

SUMMARY

The present disclosure relates to a support device for a bottom-hinged door, and more particularly to a rotating support handle assembly providing additional support to a bottom-hinged door in a horizontal open position to prevent potential tipping and deflection. The rotating support handle assembly may also reduce the load on the connection member structure of the bottom-hinged door and prevent the hinge or latch connection member from potential damage.

The present disclosure of an improved bottom-hinged door support device provides access to a graspable door handle and prevents the door handle from impacting the floor when the bottom-hinged door is in an open position. A deployable support member is hidden when the bottom-hinged door is in a closed position. In some embodiments, the disclosed device may also provide height adjustments to accommodate different floor levels and/or floor types.

In some embodiments, a rotating support handle assembly may be coupled to a bottom-hinged door, which may be capable of occupying a first position when the bottom-hinged door is closed and a second position when the bottom-hinged door is open. The rotating support handle assembly may include a handle member and a support member. The handle member may be coupled to a bottom-hinged door and rotatable between a first position corresponding to the first position and a second position of the bottom-hinged door. When the handle member rotates with respect to the bottom-hinged door from the first position to the second position, the support member may be configured to contact a floor to provide support to the bottom-hinged door when the handle member is in the second position.

In some embodiments, a rotating support handle assembly may include a handle member coupled to a bottom-hinged door rotatable between a first, closed position and a second, open position. The handle member may be configured to contact a floor to provide support to the bottom-hinged door in the second position.

In some embodiments, a rotating support handle assembly may include a rotating member, a handle member, and a support member. The rotating member may be coupled to a bottom-hinged door rotatable between a first, closed position and a second, open position, and the handle member may be coupled to the rotating member. When a user rotates the handle member to rotate the rotating member from the first position to the second position, the support member may be configured to contact a floor to provide support to the bottom-hinged door in the second position.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above-outlined features are to be understood as exemplary only, and many more features and objectives of the various embodiments may be gleaned from the disclosure herein. Therefore, no limiting interpretation of this summary is to be understood without further review of the entire specification, claims, and drawings included herewith. A more extensive presentation of features, details, utilities, and advantages of the present disclosure is provided in the following written description of various embodiments of the disclosure, illustrated in the accompanying drawings, and defined in the appended claims.

DETAILED DESCRIPTION

Figure 1:
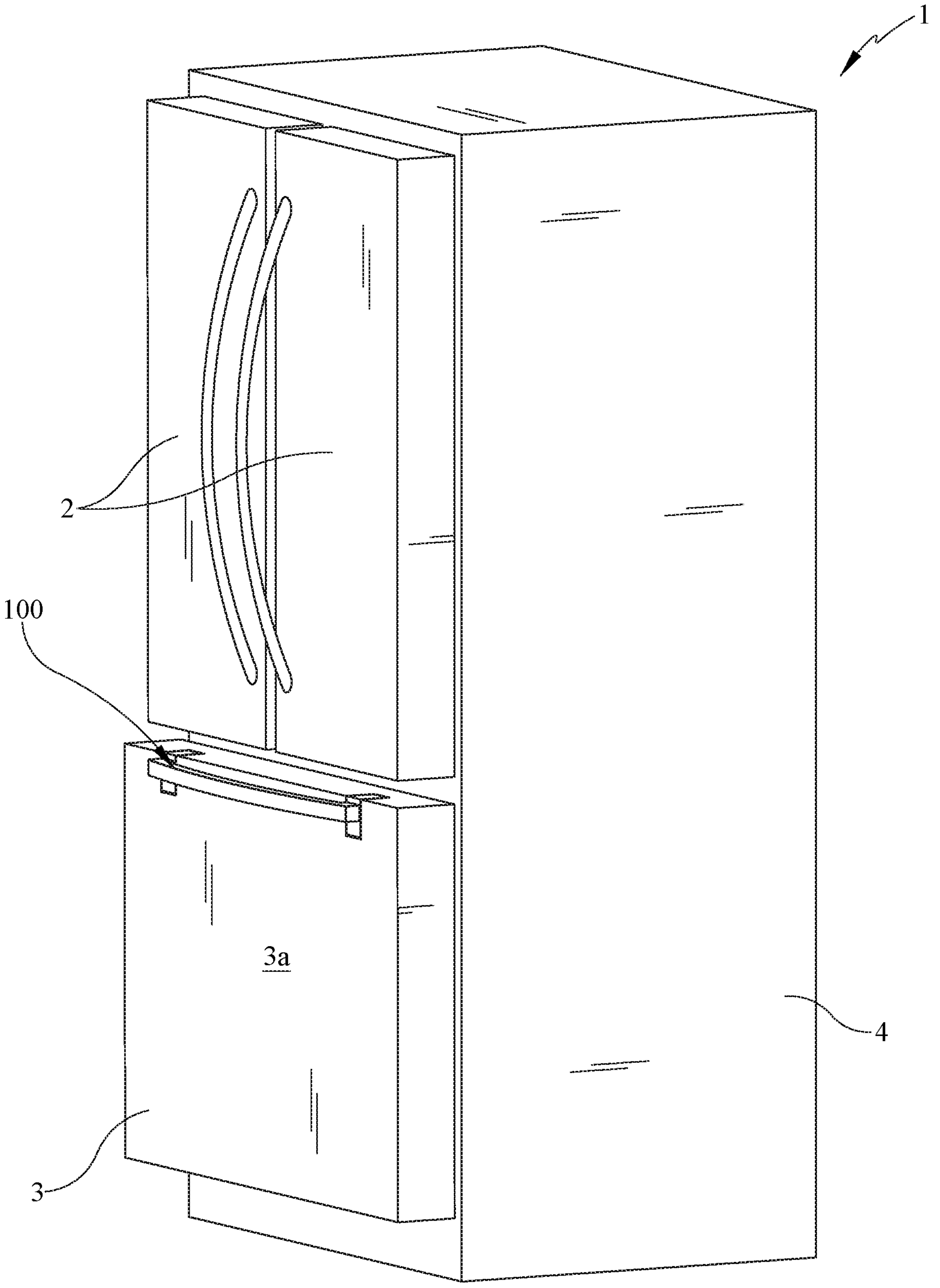
FIG. 1 is a perspective view of a residential refrigerator having a rotating support handle assembly for a bottom-hinged door with the bottom-hinged door fully closed, in accordance with various embodiments.

It is to be understood that a rotating support handle assembly for a bottom-hinged door is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to direct physical or mechanical connections or couplings. It should be noted that he rotation mechanism could vary greatly and still accomplish the same intent.

The embodiments discussed hereinafter will, for convenience only, focus on the implementation of the hereinafter-described apparatus and techniques within a residential refrigerator with a hinged door at the bottom. As shown in the Figures, the particular embodiment depicted shows a French door refrigerator 1 with a bottom-hinged door 3 to which the support solution described herein has been employed. However, it will be appreciated that the apparatus and techniques may also be used in connection with other types of kitchen appliances and even in other types of apparatus. For example, the refrigerator might be in different configurations, for example, the appliance might be just a freezer, with no refrigerator above, or the appliance might be an oven or a dishwasher. Also, the herein-described designs may be used for a kitchen cabinet or other apparatus with a bottom-hinged door.

Figure 2:
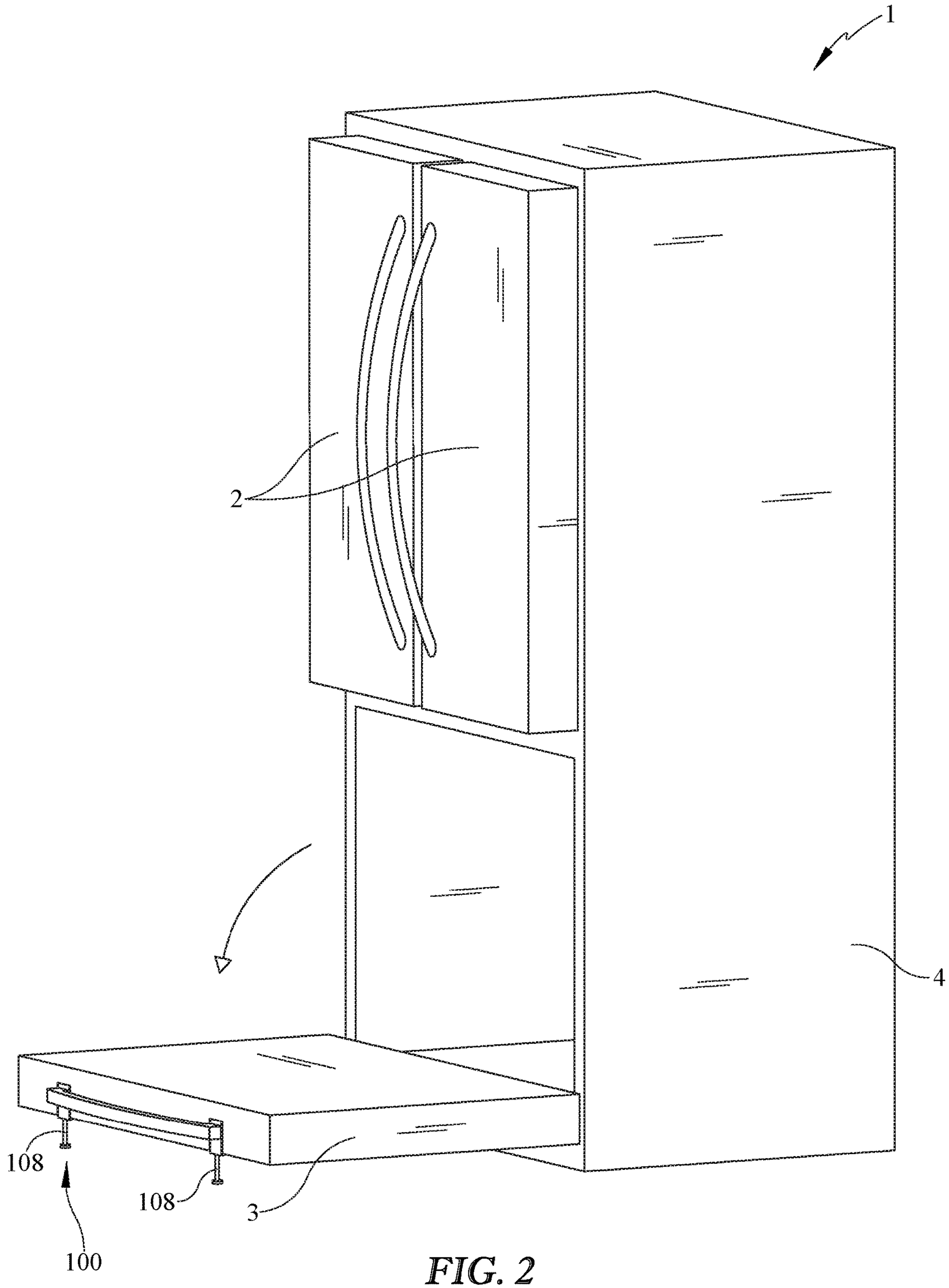
FIG. 2 is a perspective view of a residential refrigerator having a rotating support handle assembly for a bottom-hinged door with the bottom-hinged door fully open, in accordance with various embodiments.

Turning now to the drawings, wherein like numbers denote like parts throughout the several views, a rotating support handle assembly 100 for a refrigerator bottom-hinged door 3 in accordance with various embodiments will be described with reference to the accompanying drawings. FIGS. 1 and 2 illustrate an example of a French door refrigerator 1 having an upper storage region including a refrigerating chamber and a lower compartment including a freezer compartment. A pair of doors 2 may be installed at the upper storage region of the refrigerator 1 to separately open the refrigerating chamber, and the bottom-hinged door 3 may be installed at the lower compartment of the refrigerator 1 to open the freezer compartment. The pair of doors 2 may be pivotally connected to the sides of the main body 4 of the refrigerator 1, and the bottom-hinged door 3 may be coupled to a lower edge of the main body 4 through one or more latch or hinge connection members (not visible in the figures). The bottom-hinged door 3, which includes a front surface 3*a*, may remain similar in construction to that of typical freezer doors in the industry, and may, for example, have a metal outer portion, a plastic inner portion, and be injected with insulating material such as, for example, expanding foam.

In typical use, the bottom-hinged door 3 according to an embodiment herein may desirably rotate about the hinge connection member to open downwardly and outwardly from a first position (a fully closed position as shown in FIG. 1) to a second position (a fully open position as shown in FIG. 2). In its travel from the first position to the second position, the front surface 3*a* may gradually become approximately parallel to, and remain spaced above, the floor at the end of travel. This space may include one or more support devices, such as the one or more rotating support handle assemblies 100. As shown in FIG. 2, the inclusion of the support handle assembly 100 may provide a means to open and close the bottom-hinged door 3 and to support the bottom-hinged door 3, with a part of the rotating support handle assembly 100 contacting the floor when the bottom-hinged door 3 is in the second position. This provides additional support for the vertical loads from the weight of the bottom-hinged door 3 and items placed thereon, which in turn prevents the refrigerator 1 from tipping over. With the additional support from the rotating support handle assembly 100, the bottom-hinged door 3 provides a more stable open position, enabling improved safety for users. The detailed structure and operation for both the extension and retraction of the rotating support handle assembly 100 will be discussed in further detail below.

Figures 3, 3A:
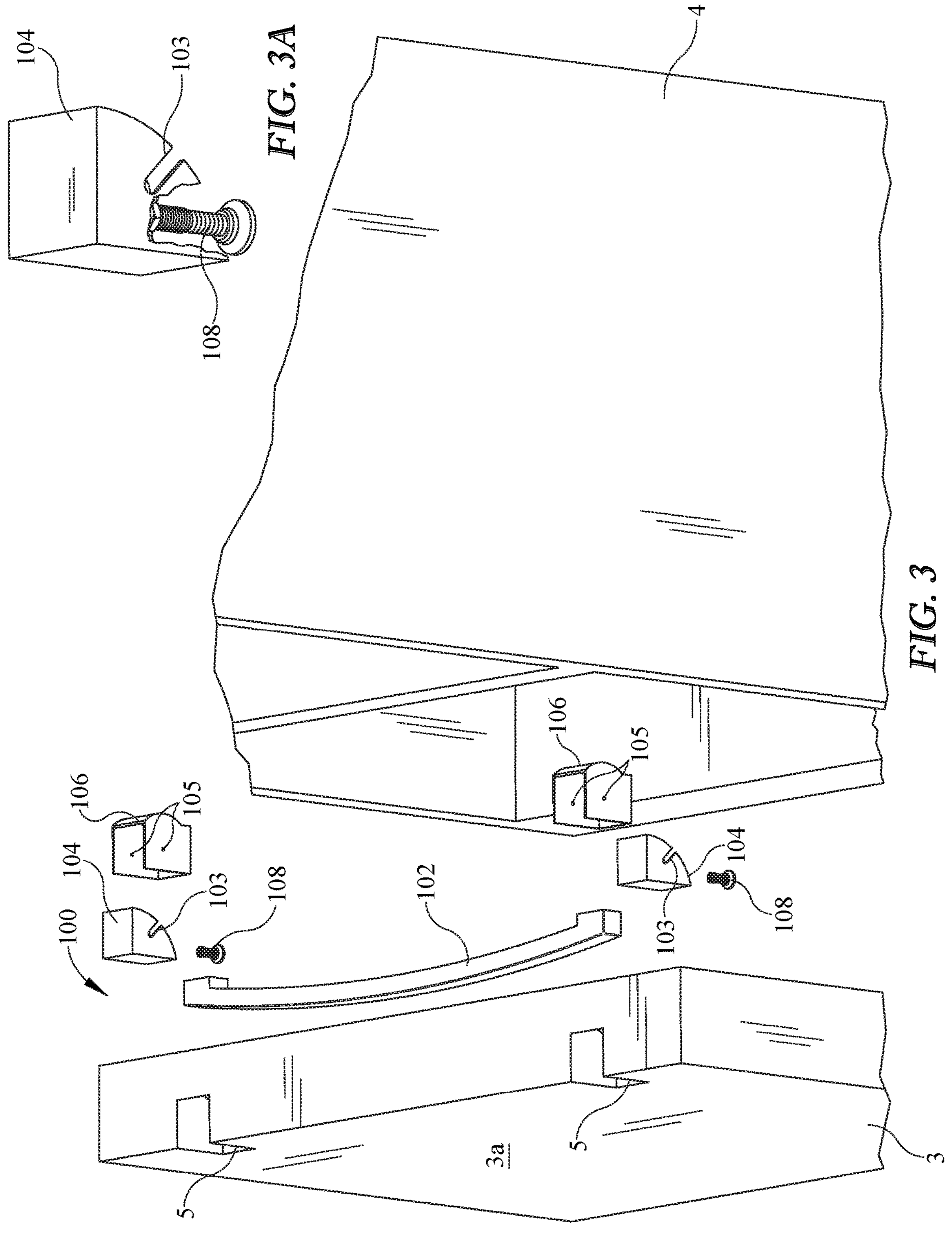
FIG. 3 is an exploded view of a rotating support handle assembly, in accordance with various embodiments.
FIG. 3A is a detailed view of a component of FIG. 3, in accordance with various embodiments.

FIG. 3 illustrates an exploded view of an exemplary rotating support handle assembly 100 in the first position in accordance with an embodiment. The rotating support handle assembly 100 may include one or more handle members 102 for grabbing by a user and to initiate the rotation and to open the bottom-hinged door 3. The handle member 102 may be a graspable section of the bottom-hinged door 3 in any suitable number, type, and configuration. For example, in some embodiments, the handle member 102 may be a bar having convex curvature and extend across the width of the bottom-hinged door 3 as shown in FIG. 3. The rotating support handle assembly 100 may further include one or more housing members 106, and in some embodiments, the handle member 102 may be coupled and rotatable within the housing member 106. As shown in FIG. 3, in some embodiments, the housing members 106 may further include one or more corresponding openings 105 and one or more rotating members 104 therewithin. In such embodiments, one or more ends of the handle member 102 may be coupled to the rotating member 104. In some embodiments, the handle member 102 may be coupled to the housing members 106 and/or the rotating member 104 through one or more fasteners. It should be noted that other various methods of coupling are possible, including, for example, welding, adhesives, geometric coupling (e.g., dovetails, tongue-and-grooves, pin-slot, ball detents, etc.), and fasteners of many types including, for example, screws, bolts, rivets, pins, spring retainers, etc. In some embodiments, the handle member 102 may be a recessed handle or a pocket handle. In such embodiments, the handle member 102 may be able to rotate without the rotating member 104.

To allow the rotating member 104 to rotate freely within the housing member 106, in some embodiments, there may be one or more slots 103 on the side surfaces of the rotating member 104, along with one or more corresponding openings 105 on the side surfaces of the housing member 106 as shown in FIGS. 3 and 3A. Accordingly, a rotation shaft (not shown here) may extend through the slot 103 and the corresponding opening 105 coextensively in a full length, allowing the rotating member 104 to rotate freely within the housing member 106. It should be noted that other rotating mechanisms (e.g., a pin-slot rotating mechanism that does not extend through the slot 103 and the corresponding opening 105, etc.) for coupling the rotating member 104 and/or or the handle member 102 within the housing member 106 may also be acceptable. The detailed rotating operation will be discussed below.

In some embodiments, the rotating member 104 and/or the housing member 106 may be an integrally formed single piece in a specific configuration as shown in FIG. 3. In some embodiments, the rotating member 104 and/or the housing member 106 may include multiple components, such as flanges. For example, the housing member 106 may include multiple members for holding a single piece rotating member 104 therebetween. It should be noted that the configuration of the rotating member 104 and/or the housing member 106 may vary and still accomplish the intended rotation.

In some embodiments, the housing member 106 may be secured in one or more cavities 5 defined within an inner space of the bottom-hinged door 3 for housing the multiple components of the rotating support handle assembly 100 therewithin. In some embodiments, the cavity 5 may be formed in an upper portion of the front surface 3*a* of the bottom-hinged door 3, as shown in FIG. 3. The area inside the bottom-hinged door 3 around the cavity 5 may be hollowed out to make room for adequate installation of the housing member 106 and the associated rotating support handle assembly 100. It should be noted that any suitable locations and quantities for the cavities 5 that may be feasible to secure the housing member 106 and the associated rotating support handle assembly 100 to the bottom-hinged door 3 may be acceptable, and various methods for securing the housing member 106 and the associated rotating support handle assembly 100 to the cavity 5, are possible, including, for example, welding, adhesives, geometric coupling (e.g., dovetails, tongue-and-grooves, pin-slot, ball detents, etc.), and fasteners of many types including, for example, screws, bolts, rivets, pins, spring retainers, etc.

The rotating support handle assembly 100 may further include one or more support members 108 coupled to the front surface 3*a*, the handle member 102, and/or the rotating member 104. In some embodiments, the rotation of the handle member 102 may allow the support member 108 to contact the floor to provide additional support to the bottom-hinged door 3 when in the second position. In some other embodiments, the support member 108 may be configured to extend out to contact the floor by pressing a button/switch or using any other suitable activation mechanisms, at any point of time during the rotation of the handle member 102. The support member 108 may be in various forms capable of supporting the vertical load of the bottom-hinged door 3. For example, in various embodiments, the support member 108 may be in a leg configuration with a resilient bottom (e.g., like a plunger, etc. using rubber, plastic, elastomeric, or other non-marking or soft or resilient materials), in a wheel configuration, or the like. In reality, because different floors may be at different heights and/or made of different materials (e.g., laminate, hardwood, tile, etc.), in some embodiments, the support member 108 may be preferably capable of height adjustment to accommodate those possible height variations. For example, as best shown in FIG. 3A, the support member 108 may be threaded within the rotating member 104 for height adjustments, and a user may adjust the support member 108 to a desired height position by moving the threaded part to a desired height position with a wrench or by hand. This may aid in proper setting of the rotating support handle assembly 100 for optimal stability and support, and may aid in protecting the front surface 3*a* of the bottom-hinged door 3 by preventing the front surface 3*a* from hitting the floor in the second position. It should be noted that other feasible mechanisms for height adjustments (e.g., a cammed system, pin-slot, spring, etc.) may also be acceptable. It should also be noted that, in some embodiments, the support member 108 may not be needed for support as the handle member 102 itself or parts of the handle member 102 may contact the floor to work as a support member.

Figure 4A:
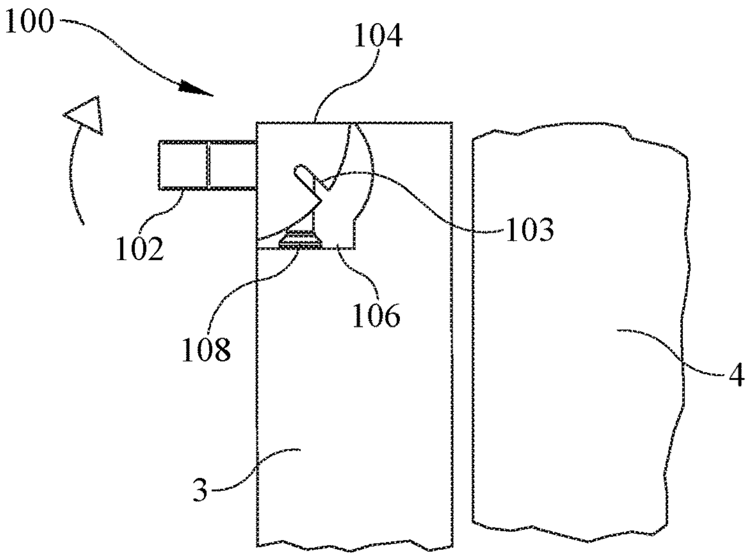
FIGS. 4A-4C are operation schematic views of a rotating support handle assembly shifting from a first closed position to a second open position, in accordance with various embodiments.
Figure 4B:
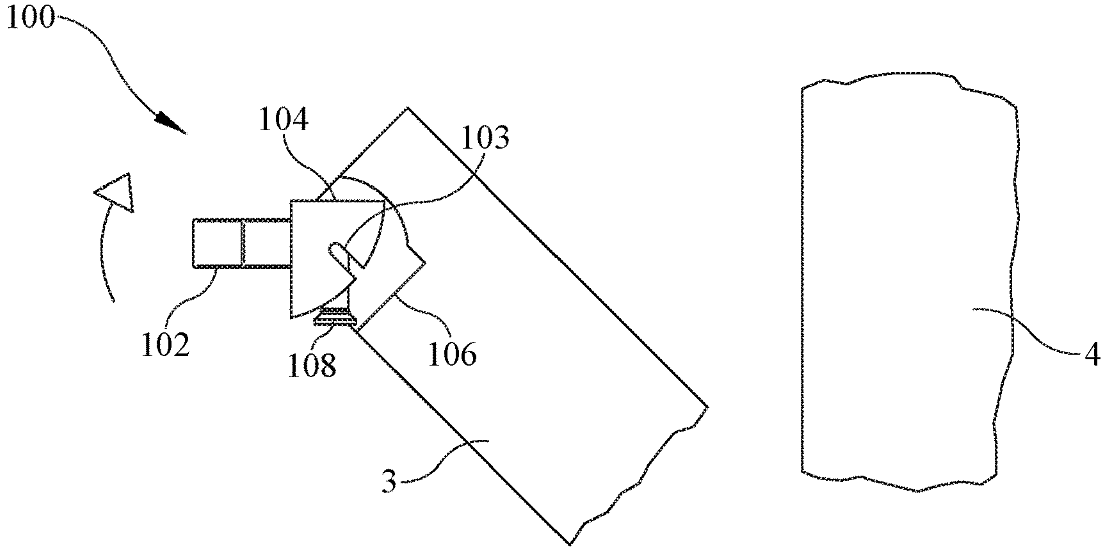
Figure 4C:
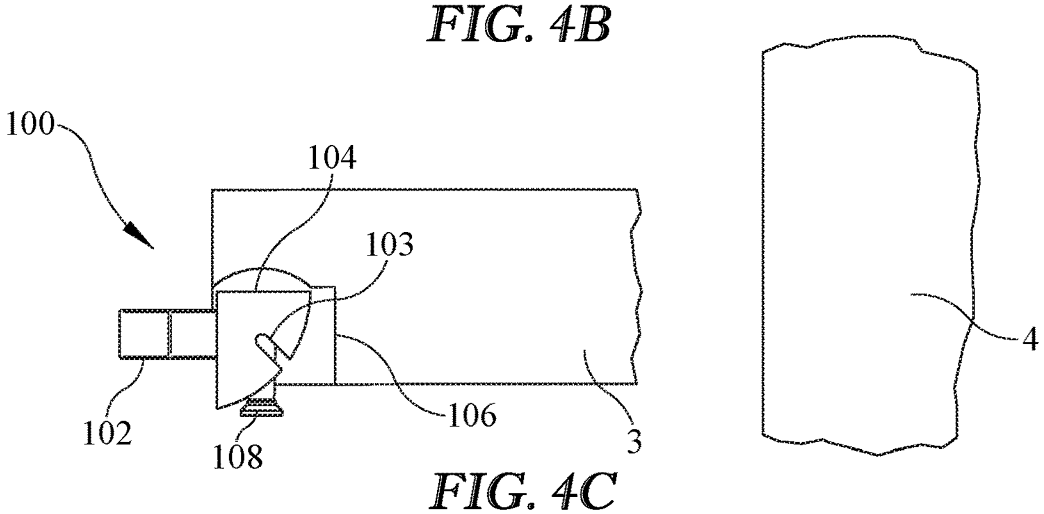

The manner in which the rotating support handle assembly 100 may move from the first position to the second position is depicted in FIGS. 4A-4C. FIG. 4A illustrates an embodiment when the bottom-hinged door 3 is in the first position, and the support member 108 is fully stowed in the housing member 106 located in the cavity 5 of the bottom-hinged door 3, and is not generally visible to users. When the bottom-hinged door 3 is opened by a user (moving from the first position to the second position), the rotating member 104 may be rotated by a pulling and rotating of the handle member 102 controlled by the user (that is, pulling and rotating clockwise as shown in FIGS. 4A and 4B), and the support member 108 may begin to extend out. At the end of the rotation as shown in FIG. 4C, the support members 108 may make contact with the floor to provide support. In reverse, when the bottom-hinged door 3 is closed (moving from the second position to the first position), the support member 108 may be retracted by a rotation in the opposite direction (that is, rotating counter-clockwise). In some embodiments as shown here, the rotating support handle assembly 100 may be capable of a range of rotational positions from approximately 0° to approximately 90°. It should be noted that other feasible rotating ranges may also be acceptable.

With the rotating support handle assembly 100 being properly deployed in the second position, the vertical load of and on the bottom-hinged door 3 may be borne largely by the support member 108 bearing against the floor. In this manner, the rotating support handle assembly 100 may provide a resistive support to the torque (tipping force) of the main body 4 of the refrigerator 1. With such a supportive arrangement, the refrigerator 1 may still remain resting safely when the bottom-hinged door 3 is fully open (that is, the bottom-hinged door 3 can be substantially parallel to the floor in the second position), thus enabling improved and enlarged access to the freezer storage inside. As the burden of the supporting of the bottom-hinged door 3 is transferred to the floor through the rotating support handle assembly 100, instead of supporting and maintaining the vertical load of the bottom-hinged door 3 only by the hinge connection member between the bottom-hinged door 3 and the main body 4, such an arrangement may prevent the distortive "bowing" or "bruising" of the structure of such door connection members. Also, when the bottom-hinged door 3 is closed in the first position, as shown in FIG. 4A, the rotating support handle assembly 100 may move into a retracted position, with the support member 108 concealed within the housing member 106, to avoid adversely impacting the aesthetic qualities of the refrigerator 1.

In some embodiments, the rotating support handle assembly 100 may include a cammed system to allow the support member 108 to be specifically positioned to stop at the front surface of the bottom-hinged door 3 before the support member 108 impacts the floor. In some embodiments, the support member 108 may extend automatically as the bottom-hinged door 3 moves towards the floor. For example, a cammed system may be used in the final 10-15 degrees of rotation to extend the support member 108 down approximately one inch. This may allow for the support member 108 to extend down below the surrounding geometry. In some embodiments, a long connecting rod may run from the handle member 102 to a hinge point. As the hinge rotates, a cam may move the connecting rod, which may move the rotating handle member 102 sequentially. This method may require a hollow cavity in at least one spot of the structure of the bottom-hinged door 3, but it would firmly lock the rotation of the handle member 102 to a fixed position and create a degree-for-degree rotation, guaranteeing the handle member 102 being always parallel to the floor. In some embodiments, a spring loaded pin/rod may be provided in the bottom-hinged door 3, and a fixed cam may be provided on a front face of an inner freezer cabinet. With the rotation of the bottom-hinged door 3, the rod may ride the cam, thereby achieving back and forth motion of the inner freezer cabinet. This motion activates the support member 108 to extend when the bottom-hinged door 3 starts to open. As it is a wedge action, the support member 108 would provide firm support to the bottom-hinged door 3. In some embodiments, the rod may be moved by a solenoid motor mounted on the inner freezer cabinet instead of the cam system. In some embodiments, the translation motion of the connecting rod may be converted into rotary motion of a link with an offset center. The rod may act as a connecting rod, and an offset link may act as a crank of a three bar linkage. The partial motion of the crank may extend or retract the support member 108.

In some embodiments, deployment of the support member 108 may be actuated in other ways, in addition to and/or in lieu of the rotation mechanism. For example, additional actuation of the support member 108 may include, but are not limited to, various forms of springs, multi-link mechanisms, power-assist mechanisms (e.g., solenoids or electrical motors or actuators), cams, linear actuators, and so forth. In some embodiments, the rotating support handle assembly 100 may consist of a torsion spring loaded support, which in free load condition will flip downward to provide adequate support when the bottom-hinged door 3 is open. Additionally, adding torsion springs (or other similar mechanisms) to the rotation mechanism may prevent a loose feeling, and keep the rotation tight and controlled. Similarly, a rotation damper may be added to further control the rotational motion. In addition, regardless of the type of springs, a torsional damper may be provided to control the rotation. The damper's main purpose is to provide resistance to the spring so that the handle member 102 would not "flop" loosely. This improves the rotation feeling for a user and allows for a smooth and slow motion. In some embodiment, the handle member 102 may be spring loaded, and possibly damped to prevent unintentional rotations. The fully closed position may also have a detent position to allow a user to hold the handle member 102 more securely when the bottom-hinged door 3 is closed.

In some embodiments, the system may be adjustable and allow for users to lock/adjust the support member 108 as needed. To prevent damage on delicate floors, a locking tab may be provided to keep support member 108 from retracting. It should be noted that the rotation mechanism and locking mechanism may vary greatly and still accomplish the same intent.

In some embodiments, the rotation mechanism may be triggered only as needed. For example, a trigger action (e.g., lifting an inner freezer basket) may initiate the support member 108 to extend and contact the floor. In some embodiments, the rotating support handle assembly 100 may have a trigger embedded. The trigger may release the handle member 102 to rotate, and the handle member 102 may rotate only by pressing the trigger. Without pressing the trigger, the handle member 102 may maintain its orientation and would not rotate. Adding a locked closed position with the trigger may ensure the handle member 102 is fixed instead of rotating or wobbling when the bottom-hinged door 3 is closed. In some embodiments, touching the handle member 102 may initiate the rotation, so that the rotation may start with the bottom-hinged door 3 being opened by a user.

In some embodiments, the rotation mechanism may be motorized. With one or more position sensors detecting the exact open angle of the bottom-hinged door 3, one or more solenoid or electrical motors may be provided to rotate the support member 108 in accordance with the opening process of the bottom-hinged door 3, allowing the support member 108 to contact the floor simultaneously when the bottom-hinged door 3 is fully open.

In some embodiments, the handle member 102 with an extra weight may be used so that the weight may act as a counterbalance to keep the handle member 102 in position when the bottom-hinged door 3 is fully open.

In some embodiments, one or more protective caps may be provided to the handle member 102 to allow the handle member 102 to be the load bearing member.

In some embodiments, additional structures (e.g., guides) may be provided to aid the movement of the inner freezer cabinet when the bottom-hinged door 3 is fully open.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein, unless characterized otherwise, are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the disclosure to the precise steps and/or forms disclosed, and obviously many modifications and variations are possible in light of the above teaching. It is intended that the scope of the disclosure and all equivalents be defined by the claims appended hereto.

What is claimed is:

1. A rotating support handle assembly coupled to a bottom-hinged door, said door capable of occupying a first position, wherein said door is closed, and a second position, wherein said door is open, said rotating support handle assembly comprising:

a handle member coupled to a bottom-hinged door, said handle member rotatable between a first position corresponding to said first position of said bottom-hinged door, and a second position corresponding to said second position of said bottom-hinged door; and a support member coupled to said handle member such that said support member rotates with said handle member, wherein said handle member rotates with respect to said bottom-hinged door from said first position to said second position, and wherein when said handle member is in said second position, said support member is positioned to contact a floor to provide support to said bottom-hinged door.

2. The rotating support handle assembly of claim 1, further comprising a housing member coupled to said bottom-hinged door, wherein said handle member rotates within said housing member and said support member is configured to conceal within said housing member when said handle member is in said first position.

3. The rotating support handle assembly of claim 2, further comprising a rotating member rotating within said housing member, wherein said handle member and said support member are coupled to said rotating member to rotate within said housing member.

4. The rotating support handle assembly of claim 2, wherein said housing member is coupled within a cavity on said bottom-hinged door.

5. The rotating support handle assembly of claim 2, wherein said housing member is in an integral single piece configuration.

6. The rotating support handle assembly of claim 3, wherein said rotating member rotates within said housing member through a rotation shaft mechanism.

7. The rotating support handle assembly of claim 3, wherein said rotating member rotates within said housing member through a pin-slot mechanism.

8. The rotating support handle assembly of claim 1, wherein said support member is height adjustable.

9. The rotating support handle assembly of claim 8, wherein said support member is threaded for height adjustment.

10. The rotating support handle assembly of claim 1, wherein said support member is in a leg configuration with a resilient bottom.

11. The rotating support handle assembly of claim 1, wherein said support member extends substantially perpendicular to said handle member.

12. A rotating support handle assembly, comprising:

a handle member rotatably coupled to a bottom-hinged door that is rotatable between a first, closed position and a second, open position, wherein said handle member is rotatable between first and second positions; and a support member coupled to said handle member such that said support member rotates with said handle member relative to the bottom-hinged door, wherein said support member is configured to contact a floor to provide support to said bottom-hinged door when said handle member is rotated to said second position and the bottom-hinged door is in said second, open position.

13. The rotating support handle assembly of claim 12, wherein said handle member is coupled to and rotates within a cavity on said bottom-hinged door.

14. The rotating support handle assembly of claim 13, wherein said support member is configured to conceal in said cavity in said first position of said handle member.

15. A rotating support handle assembly, comprising:

a rotating member rotatably coupled to a bottom-hinged door rotatable between a first, closed position and a second, open position, wherein said rotating member is rotatable between first and second positions;

a handle member coupled to said rotating member to rotate with said rotating member; and a support member coupled to said rotating member to rotate with said rotating member, wherein said rotating member rotates from said first position to said second position by rotating said handle member by a user, and said support member is configured to contact a floor to provide support to said bottom-hinged door when said rotating member is rotated to said second position and the bottom-hinged door is in said second, open position.

16. The rotating support handle assembly of claim 15, wherein said rotating member is coupled to and rotates within a cavity on said bottom-hinged door.

17. The rotating support handle assembly of claim 16, wherein said support member is configured to conceal in said cavity in said first position of said rotating member.

* * * * *